United States Patent [19]
Daly et al.

[11] Patent Number: 5,708,039
[45] Date of Patent: Jan. 13, 1998

[54] SMOOTH THIN FILM POWDER COATINGS

[75] Inventors: Andrew T. Daly; Navin B. Shah, both of Sinking Spring; Glenn D. Correll, Birdsboro; Karl R. Wursthorn, Mohnton, all of Pa.

[73] Assignee: Morton International, Inc., Chicago, Ill.

[21] Appl. No.: 662,104

[22] Filed: Jun. 14, 1996

Related U.S. Application Data

[63] Continuation of Ser. No. 354,308, Dec. 12, 1994, abandoned.

[51] Int. Cl.$^6$ .................................................... C08G 18/32
[52] U.S. Cl. .......................... 521/61; 521/60; 521/56; 521/76; 428/361; 428/372; 428/402; 427/447; 427/461; 427/487
[58] Field of Search ...................... 521/61, 60, 56, 521/76; 428/361, 372, 402; 427/447, 461, 487

[56] References Cited

U.S. PATENT DOCUMENTS

| | | | |
|---|---|---|---|
| 2,566,292 | 8/1951 | Reese | 159/4 |
| 3,166,613 | 1/1965 | Wright et al. | 264/12 |
| 3,561,003 | 2/1971 | Lanham et al. | 106/22 |
| 3,676,172 | 7/1972 | Van Dyk et al. | 117/21 |
| 3,803,111 | 4/1974 | Munro et al. | 260/89.5 |
| 3,864,322 | 2/1975 | Yallourakis | 260/87.5 |
| 3,932,347 | 1/1976 | Camelon et al. | 260/42.14 |
| 3,942,261 | 3/1976 | Hirata et al. | 34/5 |
| 3,943,082 | 3/1976 | Smith et al. | 260/23 R |
| 3,981,957 | 9/1976 | van Brederode et al. | 260/878 R |
| 4,009,131 | 2/1977 | Farone | 260/23 R |
| 4,012,461 | 3/1977 | van Brederode | 260/878 R |
| 4,582,731 | 4/1986 | Smith | 427/421 |
| 4,649,037 | 3/1987 | Marsh et al. | 423/338 |
| 4,708,967 | 11/1987 | Ferentchak et al. | 521/56 |
| 4,713,233 | 12/1987 | Marsh et al. | 423/608 |
| 4,734,227 | 3/1988 | Smith | 264/13 |
| 4,734,451 | 3/1988 | Smith | 524/493 |
| 4,737,384 | 4/1988 | Murthy et al. | 427/369 |
| 4,882,107 | 11/1989 | Cavender et al. | 264/51 |
| 4,923,720 | 5/1990 | Lee et al. | 427/422 |
| 4,970,093 | 11/1990 | Sievers et al. | 427/38 |
| 5,009,367 | 4/1991 | Nielsen | 239/3 |
| 5,011,819 | 4/1991 | Leibovitz | 505/1 |
| 5,027,742 | 7/1991 | Lee et al. | 118/300 |
| 5,057,342 | 10/1991 | Hoy et al. | 427/422 |

(List continued on next page.)

FOREIGN PATENT DOCUMENTS

| | | | |
|---|---|---|---|
| 0661091 | 7/1995 | European Pat. Off. | B01J 2/04 |
| 2853066 | 12/1978 | Germany . | |
| 9200342 | 1/1992 | WIPO | C08J 3/12 |
| WO9411446 | 5/1996 | WIPO . | |

OTHER PUBLICATIONS

Koop, Peggy M. "Emerging Technology", *Power Coating*, Mar., 1996, pp. 58–63.

Production of Fine Powders by the Rapid Expansion of Supercritical Fluid Solutions—D.W. Matson, R.C. Petersen & R.D. Smith—Advances in Ceramics, vol. 21: Ceramic Powder Science, Copyright 1987, The American Ceramic Society, Inc.

*Primary Examiner*—James J. Seidleck
*Assistant Examiner*—Duc Troung
*Attorney, Agent, or Firm*—Robert M. Didrick; Gerald K. White

[57] ABSTRACT

A coating powder consisting essentially of generally spherical particles ranging in size from less than 2 to about 40 microns, 75% of whose volume consists of particles of from about 2 to about 20 microns in size, is provided by dissolving the components of the coating powder in a supercritical fluid without the aid of a surfactant and spraying the solution into a zone whose pressure is less than that of the fluid. A very smooth continuous film of a cured thermosettable coating powder is achieved even when the film thickness is less than 1 mil, e.g., from about 0.2 and greater. The advantages of powder coatings may now be realized fully in the automobile and can industries.

14 Claims, 4 Drawing Sheets

U.S. PATENT DOCUMENTS

| | | | |
|---|---|---|---|
| 5,063,267 | 11/1991 | Hanneman et al. | 524/284 |
| 5,066,522 | 11/1991 | Cole et al. | 427/422 |
| 5,088,443 | 2/1992 | Hastings et al. | 118/314 |
| 5,105,843 | 4/1992 | Condron et al. | 137/13 |
| 5,106,650 | 4/1992 | Hoy et al. | 427/27 |
| 5,106,659 | 4/1992 | Hastings et al. | 427/421 |
| 5,108,799 | 4/1992 | Hoy et al. | 427/422 |
| 5,118,530 | 6/1992 | Hanneman et al. | 427/226 |
| 5,141,156 | 8/1992 | Hoy et al. | 239/135 |
| 5,170,727 | 12/1992 | Nielsen | 431/2 |
| 5,171,613 | 12/1992 | Bok et al. | 427/422 |
| 5,178,325 | 1/1993 | Nielsen | 239/1 |
| 5,197,800 | 3/1993 | Saidman et al. | 366/136 |
| 5,207,954 | 5/1993 | Lewis et al. | 264/13 |
| 5,211,342 | 5/1993 | Hoy et al. | 239/707 |
| 5,214,925 | 6/1993 | Hoy et al. | 62/50.6 |
| 5,215,253 | 6/1993 | Saidman et al. | 239/61 |
| 5,254,260 | 10/1993 | Nielsen et al. | 210/651 |
| 5,267,390 | 12/1993 | Yang et al. | 29/527.4 |
| 5,270,082 | 12/1993 | Lin et al. | 427/539 |
| 5,290,602 | 3/1994 | Argyropoulous et al. | 427/421 |
| 5,290,603 | 3/1994 | Nielsen et al. | 427/421 |
| 5,290,604 | 3/1994 | Nielsen | 427/421 |
| 5,290,827 | 3/1994 | Shine | 523/340 |
| 5,304,390 | 4/1994 | Condron et al. | 427/8 |
| 5,306,350 | 4/1994 | Hoy et al. | 134/22.14 |
| 5,306,648 | 4/1994 | Fukaya et al. | 437/3 |
| 5,308,647 | 5/1994 | Lappi | 427/154 |
| 5,312,862 | 5/1994 | Nielsen et al. | 524/552 |
| 5,330,783 | 7/1994 | Saidman et al. | 427/8 |
| 5,399,597 | 3/1995 | Mandel et al. | 523/342 |

SMOOTH THIN FILM POWDER COATINGS

This is a continuation of application Ser. No. 08/354,308 filed on Dec. 12, 1994, now abandoned.

BACKGROUND OF THE INVENTION

This invention relates to thermoplastic and thermosettable coating powders consisting essentially of generally spherical particles ranging in size from less than about 2 to about 40 microns. It also relates to an ultra thin, continuous, and very smooth film of a thermoset coating powder consequent from said shape and size. It also relates to a method for providing such powders and to a method for forming said smooth continuous film.

Because of increased environmental concerns, much effort has been directed to the problem of reducing pollution caused by the evaporation of solvents from paints. Part of these efforts has been the development of new coating technologies which eliminate or at least diminish the emission of organic solvent vapors into the atmosphere. Possibly the most successful development in terms of the elimination of solvent vapors has been that of the powder coating technology since the mid-50's. As Bok et al say in U.S. Pat. No. 5,171,613, however, powder coatings are generally characterized as having poor film uniformity, poor distinctness of image (DOI), and either poor gloss or good gloss with a concomitant heavy orange peel look. Excessive film thickness and/or high cure temperatures are required to obtain even such limited performance properties, according to Bok et al.

As evident from Bok et al and other sources, there has been a long felt need in sectors of the coating industry, such as automotive and canning, for virtually solvent-free coatings which, while being ultra thin, still function to adequately protect the substrate. Despite the beliefs and reservations expressed in the Bok et al. patent regarding the suitability of powder coatings, the powder coatings of this invention provide a solution to such long felt need. Coatings for automotive applications such as clear top coats are characterized by smooth, highly glossy, continuous films that provide a good visual impression of surface appearance. Such coatings are also desirably of light weight and low cost. In contrast to such desired coatings, hazy or yellowed coatings are undesirable. In addition, DOI is a very important property. Can linings obviously must be continuous films to protect the underlying substrate. Such continuous films can be realized with use of the ultra thin powder coatings of the invention with important advantages in cost and weight.

Conventionally, the manufacture of a coating powder comprises either melt-mixing or dry blending a resin, a curing agent, plasticizers, stabilizers, flow aids, pigments, and extenders. Dry blending is used to make PVC powders under conditions not amenable to the formation of very fine powders. Melt-mixing involves the high speed, high intensity mixing of the dry ingredients in a Henschel mixer or the like and then heating the mixture in a high shear mixer such as an extruder to achieve thorough dispersion of the other ingredients in the resin as it melts. The cooled melt is then ground to a powder and the particles are air-classified to obtain the best possible particle size distribution. By such procedure, according to the article entitled "Powder Coatings" by Richart in the "Kirk-Othmer Encyclopedia of Chemical Technology", Volume 19, Third Edition, John Wiley & Sons, the size of up to 60 % of the particles of a typical powder intended for application by the electrostatic spray method is 44μ or larger. Many fines remain, however. Said article is incorporated herein by reference.

In U.S. Pat. No. 5,207,954, Lewis et al. teach the spray drying of aqueous emulsions of acrylic resins with and without encapsulated pigments and the like. The resins are prepared by emulsion polymerization processes which require the presence of surfactants, chain stoppers, and other additives which remain with the spray dried coating powders and are believed to contribute to the orange peel surface appearance (or microwaviness) of the coatings of the working examples of the patent. The thickness of said coatings ranges from 0.5 mil to 2.3 mils. The DOI is also rather poor when contrasted to that of the instant invention.

Smith, in U.S. Pat. Nos. 4,582,731 and 4,734,451, discloses a method and apparatus for the deposition of thin films and the formation of powder coatings through the molecular spray of solutes dissolved in organic and supercritical fluid solvents. The concentration of said solutes is described as being quite dilute—on the order of about 0.1 percent. In conventional coating applications, the solute concentration is normally about 50 times greater than that. The molecular spray is defined as "of individual molecules (atoms) or very small clusters of solute" which are on the order of about 30 Ångstroms ($3\times10^{-3}$ micron) in diameter. Said droplets are as much as one billion times less massive than the droplets formed in the liquid spray application methods that Smith refers to as conventional. Smith teaches in U.S. Pat. No. 4,734,451 that nearly spherical powders of organic materials can be made in a very narrow range of size and shape wherein the average particle sizes are from 1 to 3 microns.

In U.S. Pat. No. 4,012,461, van Brederode teaches the preparation of fine polymer powders by a process which comprises dissolving from 1 to 40 percent of a polymer in a solvent at from 90° to 165° C., cooling the solution under high shear to precipitate some of the polymer but leave an amount in solution which is less than that which would inhibit the formation of droplets upon atomization of the slurry into a drying zone, atomizing said slurry into said drying zone, and recovering spherical particles predominantly of a size suitable for electrostatically sprayed coatings, e.g., a range of about 5 to 60 microns. Substantially all of the particles are said to be less than 75 microns (about 3 mils) in size. It is not possible to form smooth thin films, e.g., 1 mil or less, by fusing coating powders when large portions of the particles are larger than 2 mils in diameter.

One of the necessary properties for the formation of a smooth film is that the fused resin should flow easily across the surface of the substrate; to do that, it must have a low viscosity. Though the molecular weight of a resin is generally proportional to its glass transition temperature, structure plays a part also. Thus, the aromatic backbone of epoxy resins derived from bisphenols or novolac resins imparts a relatively high $T_g$ and a relatively low melt viscosity to resins of low molecular weight. Other resins having a $T_g$ similar to that of such an epoxy resin must have higher molecular weights and the concomitant higher melt viscosity. Flow aids (anti-cratering agents) are added to assist leveling and wetting.

Gelation of a thermosetting resin before it flows out evenly means that the film will not be smooth and thus the rate of cure of the resin also affects the smoothness of the film. The powder coating industry strives to prevent outgassing during gelation of a thermosetting powder because the resulting microscopic pinholes would hurt the appearance of the cured film. Nakamichi, in "Prog. Org. Coat.", Vol. 8, page 9 (1980) and Eley, in "Org. Coat. Plast. Chem.", Vol.42, page 417, American Chemical Society (1980) have evaluated the effect of resin viscosity, reaction rates, and rate of heating on gloss, adhesion, and surface finish. The Nakamichi and Eley articles are incorporated herein by reference.

The size and shape of the powder particles also affect the continuity, smoothness, and gloss of thermoset films as well as the electrocoatability of the powder. Heretofore, however, a coating powder having a sufficiently narrow distribution of spherical particles smaller than 40 microns has not been known.

SUMMARY OF THE INVENTION

Therefore, it is an object of this invention to provide novel thermoplastic and thermosettable coating powders.

It is a related object of this invention to provide a thermosettable coating powder consisting essentially of generally spherical particles ranging in size from less than 2 to about 40 microns.

It is another object of this invention to provide a thermosettable coating powder consisting essentially of cellular, generally spherical particles.

It is another object of this invention to provide a method for providing said coating powder.

It is another object of this invention to provide a surfactant-free thermosettable coating powder consisting essentially of generally spherical particles ranging in size from less than 2 to about 40 microns.

It is another object of this invention to provide an ultra thin, continuous, and very smooth film of a thermoset coating powder for metal, plastic, wood, and wood composite substrates.

It is yet another object of this invention to provide a method for forming a smooth continuous film of a thermoset coating powder on such a substrate.

These and other objects of this invention which will become apparent from the following description thereof are achieved by a coating powder consisting essentially of low density generally spherical particles having a particle size range of from less than about 2 to about 40 microns, and by applying the resultant powder to a substrate, fusing the powder and, in the case of a thermosettable powder, curing it.

DETAILED DESCRIPTION OF THE INVENTION

Figure 1:
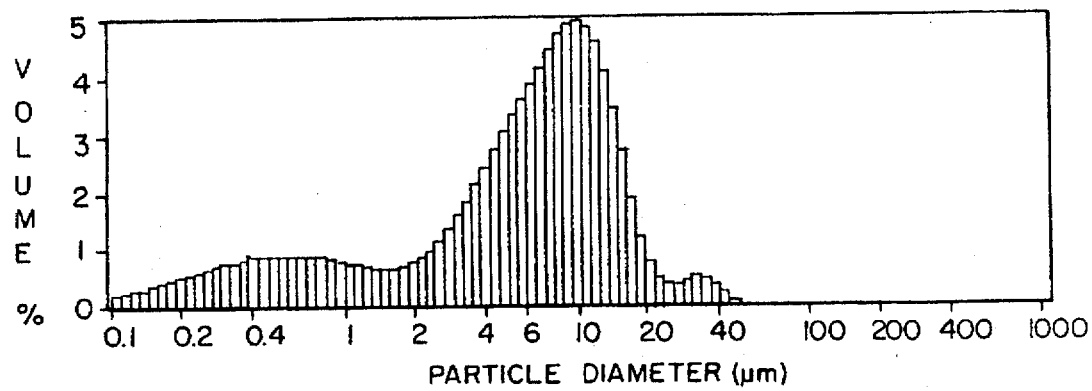
FIG. 1 is a graph showing the particle size distribution of the coating powder of this invention. The volume percent is on a linear scale and the particle diameter is on a logarithmic (base 10) scale.

As used herein, "supercritical fluid" is a material that is at a temperature and pressure such that it is at, above, or slightly below its critical point. As used herein, the critical point is the transition point at which the liquid and gaseous states merge into each other and represents the combination of the critical temperature and critical pressure for a given substance. The critical temperature as used herein is defined as the temperature above which a gas cannot be liquefied by an increase in pressure. The critical pressure as used herein is defined as that pressure which is just sufficient to cause the appearance of two phases at the critical temperature.

At a point just above the critical temperature where small changes in pressure result in large changes in the density of the supercritical fluid, the compressibility of supercritical gases is great. The "liquid-like" behavior of a supercritical fluid at higher pressures results in greatly enhanced solubilizing capabilities compared to those of the "subcritical" gas, with higher diffusion coefficients and an extended useful temperature range compared to liquids. Compounds of high molecular weight can often be dissolved in the supercritical phase at relatively low temperatures.

An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. Thus the threshold pressure is the pressure (for a given temperature) at which the solubility of a compound increases greatly (i.e., becomes detectable).

The term "generally spherical particles" as used within the context of this invention, encompasses particles having true spherical shapes to those having near spherical shapes. Near spherical shapes include ovoid shaped particles; particles having open or closed bulbous protuberances, such protuberances may or may not be generally spherically shaped; and particles having cellular portions therein. Such cellular portions may extend or be contained internally and/or externally of the major surface of the particle and may be open or closed. The term "cellular", as used within the context of this invention, means having at least some hollow portions. The great majority of the particles of this invention are cellular but the presence of solid particles would not materially affect the performance of the powder for the purposes of this invention and said presence is not precluded.

Examples of compounds which can be used as supercritical solvents are given in Table I. Others will occur to those skilled in the art.

TABLE I

EXAMPLES OF SUPERCRITICAL SOLVENTS

| Compound | Boiling Point (°C.) | Critical Temperature (°C.) | Critical Pressure (atm) | Critical Density (g/cm$^3$) |
| --- | --- | --- | --- | --- |
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.1 | 0.45 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Benzene | 80.1 | 288.9 | 48.3 | 0.302 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |

TABLE I-continued

EXAMPLES OF SUPERCRITICAL SOLVENTS

| Compound | Boiling Point (°C.) | Critical Temperature (°C.) | Critical Pressure (atm) | Critical Density (g/cm$^3$) |
|---|---|---|---|---|
| Chlorotrifluoromethane | 31.2 | 28.0 | 38.7 | 0.579 |
| Monofluoromethane | 78.4 | 44.6 | 58.0 | 0.3 |
| Toluene | 110.6 | 320.0 | 40.6 | 0.292 |
| Pyridine | 115.5 | 347.0 | 55.6 | 0.312 |
| Cyclohexane | 80.74 | 280.0 | 40.2 | 0.273 |
| m-Cresol | 202.2 | 433.0 | 45.0 | 0.346 |
| Decalin | 195.65 | 391.0 | 25.8 | 0.254 |
| Cyclohexanol | 155.65 | 356.0 | 38.0 | 0.273 |
| o-Xylene | 144.4 | 357.0 | 35.0 | 0.284 |
| Tetralin | 207.57 | 446.0 | 34.7 | 0.309 |
| Aniline | 184.13 | 426.0 | 52.4 | 0.34 |

Near supercritical liquids demonstrate solubility characteristics and other properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some compounds. These variations are considered to be within the concept of a supercritical fluid as used in the context of this invention.

The supercritical fluid diluent is used in an amount sufficient to dissolve the components of a coating powder, suitably in amounts ranging from 5 to about 90 wt. % based upon the total weight of the resulting solution. Typically, it is present in amounts ranging from 20–80 wt. % on the same basis, thereby producing a solution having a viscosity such that it may flow freely through a spray nozzle and be atomized.

Carbon dioxide is a preferred supercritical fluid for the purpose of this invention. The solvency of supercritical carbon dioxide is like that of a lower hydrocarbon (e.g., butane, pentane, or hexane) and, as a result, one can consider supercritical carbon dioxide as a replacement for the hydrocarbon diluent portion of a conventional solvent borne coating formulation.

It is sometimes necessary to employ co-solvents in order to fully dissolve some components of the coating powder mixture. Co-solvent(s) suitable for the practice of this invention generally include any solvent or mixture of solvents which is miscible with the supercritical fluid and is a good solvent for a powder component. Solubility parameters may be taken into account in the choice of the solvent. It is recognized that some organic solvents, such as cyclohexanol, have utility as both conventional solvents and as supercritical fluid diluents. As used herein, the term "co-solvent" does not include solvents in the supercritical state.

Among suitable co-solvents are: tetrahydrofuran, ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters, methyl t-butyl ethers, dibutyl ether, methyl phenyl ether and other aliphatic or alkyl aromatic ethers; glycol ethers such ethoxyethanol, butoxyethanol, ethoxypropanol, propoxyethanol, butoxypropanol and other glycol ethers; glycol ether ester such as butoxyethoxy acetate, ethyl ethoxy propionate and other glycol ether esters; alcohols such methanol, ethanol, propanol, 2-propanol, butanol, amyl alcohol and other aliphatic alcohols; aromatic hydrocarbons such as toluene, xylene, and other aromatics or mixtures of aromatic solvents; and nitro alkanes such as 2-nitropropane. Generally, solvents suitable for this invention must have the desired solvency characteristics as aforementioned and also the proper balance of evaporation rates so as to insure good powder formation. A review of the structural relationships important to choice of solvent or solvent blend is given by Dileep et al., *Ind. Eng. Chem.* (Product Research and Development) 24, 162, 1985 and Francis, A. W., *J. Phys. Chem.* 58, 1009, 1954.

Surfactants and other additives such as chain stoppers are not used in this invention and their deleterious efforts on the final film are thus avoided.

Thermoplastic resins suitable for use in the coating powders of this invention must melt and flow out to a thin film within a few minutes at application temperatures of from 200° to 300° C. without significant degradation. Polyamides, polyesters, cellulose esters, polyethylene, polypropylene, poly (vinyl chloride) or PVC, poly (vinylidene fluoride) or PVF$_2$, and poly (tetrafluoroethylene) or PTFE are examples of suitable thermoplastic resins. Plasticization of PVC has been the conventional way to lower its melt viscosity so that it will flow sufficiently when heated to form a continuous film. Nylon-11 and nylon-12 resins are representative of the polyamides and cellulose acetate butyrate is an example of the cellulose esters contemplated for use in this invention. All of the suitable thermoplastic resins are available commercially from numerous sources.

The thermosettable resins which are suitable for this invention include epoxy resins, polyurethanes, silicones, polyesters, acrylics, and hybrids such as epoxy-acrylic, polyester-acrylic, and epoxy-polyester. The glass transition temperature ($T_g$) of these resins must be high enough that the particles do not fuse together or sinter at temperatures likely to be encountered during transportation and storage. Preferably, the $T_g$ is at least about 50° C.

The epoxy resins are those containing aliphatic or aromatic backbones with oxirane functionality and are exemplified by the diglycidyl ether condensation polymers resulting from the reaction of epichlorohydrin with a bisphenol in the presence of an alkaline catalyst. Bisphenol A is most commonly used but the bisphenols B, F, G and H are also suitable. By controlling the operating conditions and varying the ratio of the reactants, products of various equivalent weights can be made. For the purposes of this invention, the epoxide equivalent weight (EEW) may be from about 600 to about 2000 and the hydroxyl equivalent weight may be from about 300 to about 400. These are available from a wide variety of commercial sources. The GT-series of bisphenol A epoxies from Ciba-Geigy, including 7004, 7013, 7014, 7074, and 7097 are examples of useful epoxy resins in this invention. Shell Chemical Co. also supplies suitable epoxy resins under its EPON trademark.

Dicyandiamide, modified and substituted dicyandiamides, solid dicarboxylic acids and their arthydrides are examples of the many agents that may be used for the curing of epoxy resins. A curing agent in solid form is preferred for convenience in the formulation of epoxy resin-based powders as well as in the formulation of other resin-based powders in this invention.

Hydroxy functional polyesters are predominantly hydroxyl in functionality; their acid number is preferably about 15 or less and, even more preferably, from about 1 to 2. The hydroxyl number, on the other hand, is preferably from about 25 to about 50, as conventionally reported. The $T_g$ is preferably higher than 50° C. because of its effect on the blocking problem. They are the condensation products of polybasic carboxylic acids and polyhydric alcohols. Examples of carboxylic acids useful for the preparation of such polyester resins are phthalic acid, tetra- and hexahydrophthalic acids and their anhydrides, adipic acid, sebacic acid, terephthalic and isophthalic acids, 1,3- and 1,4-cyclohexane-dicarboxylic acids, and trimellitic anhydride, esters of such acids and mixtures of two or more. Ethylene-, diethylene-, propylene-, and trimethylene glycol exemplify the bifunctional alcohols, along with other dihydric alcohols such as hexanediol, 1,3-, 1,2-, and 1,4-butanediols, neopentylglycol,2-butyl-2-ethyl-1,3-propanediol, 2-methyl-1,3-propanediol, 1,4-cyclohexanediol, trimethylolpropane, and mixtures of two or more. Condensation of the acids and alcohols is a well known reaction and various processes for carrying it out are also well known. The temperature is suitably from about 180° C. to about 300° C.; an azeotropic distillation with a solvent or a stream of an inert gas through a molten mixture of the reactants may be used to enhance the removal of water formed by the condensation; and a catalyst such as p-toluenesulfonic acid or dibutyltin oxide may be used. An ester interchange reaction catalyzed by a lead carboxylate or oxide, zinc acetate, lithium hydroxide or carboxylate may be used at temperatures of 200° to 300° C. Hydroxy functional polyesters are commercially available under the trademarks RUCOTE 107, CARGILL 3000, CARGILL 3016, and CRYLCOAT 3109.

The hydroxyl-functional polyesters are curable through the hydroxyl groups with aminoplasts and with aliphatic and aromatic isocyanates. Isocyanate curing forms resins which technically are polyurethanes but are often sold as polyesters. The aminoplasts are oligomers that are the reaction products of aldehydes, particularly formaldehyde, with amino- or amido-group-carrying substances exemplified by melamine, urea, dicyandiamide, and benzoguanamine. It is preferable in many instances to employ precursors of aminoplasts such as hexamethylol msiamine, dimethylol urea, and their etherified forms, i.e, modified with alkanols having from one to four carbon atoms. Hexamethoxymethyl melamine and tetramethoxy glycoluril exemplify said etherified forms. Thus, a wide variety of commercially available aminoplasts and their precursors can be used for combining with the linear polyesters of this invention. Particularly preferred are the amino cross-linking agents sold by American Cyanamid under the trademark CYMEL. In particular, the CYMEL 301, CYMEL 303, and CYMEL 385 alkylated melamine-formaldehyde resins are useful. Of course, it is possible to use mixtures of all of the above N-methylol products.

Aminoplast curing agents are generally provided in an amount sufficient to react with at least one-half the hydroxyl groups of the polyester, i.e., be present at least one-half the stoichiometric equivalent of the hydroxyl functionality. Preferably, the cross-linking agent is sufficient to substantially completely react with all of the hydroxyl functionality of the polyester, and cross-linking agents having nitrogen cross-linking functionality are provided in amounts of from about 2 to about 12 equivalents of nitrogen cross-linking functionality per equivalent of hydroxyl functionality of the polyester. This typically translates to an aminoplast being provided at between about 10 and about 70 phr.

The curing of hydroxyl-functional polyesters with an aminoplast takes place in about 20–30 minutes at temperatures within the range of from about 120°–200° C. (about 250°–400° F.).

Acidic catalysts may be used to modify the curing of the polyester with an aminoplast resin by lowering the required temperature or raising the reaction rate or both. When it is desirable to lower the rate at ambient storage temperatures, the acidic catalyst may be blocked with an amine. Volatile amines which may escape from the curing film when the catalyst is unblocked by heat are suitable for this purpose. It is particularly desirable for the purposes of this invention to delay full curing of the composition until the coated metal substrate has traveled about three-fourths of the length of the curing oven. In a particular embodiment, the dwell time before full curing was about 33 seconds. An amine-blocked dinonylnaphthalenesulfonic acid sold by King Industries under the trademark and number NACURE 1557 is an example of the blocked acid catalyst contemplated for use in the aminoplast curing of the powder coating composition of this invention. The curing may also be retarded by the addition of free amines such as triethanolamine.

The diisocyanates cure the hydroxy-functional polyester resin by forming urethane linkages between the polymer chains at the hydroxyl group sites. Aliphatic diisocyanates are exemplified by hexamethylene diisocyanate (HDI), diisocyanato di-cyclohexylmethane (sold under the trademark DESMODUR W by Miles Chemical), and isophorone diisocyanate (IPDI). Toluene diisocyanate (TDI) is an example of a suitable aromatic diisocyanate. The low-temperature reactivity of free diisocyanates may be lessened by adducting them with blocking agents selected from phenol, cresols, isononylphenol, amides such as ε-caprolactam, oximes such as methyl-ethyl ketoxime and butanoneoxime, active methylene group-containing compounds such as diethylmalonate and isopropylidene malonate and the acetoacetates, and sodium bisulfite. The adducts have a weak bond which breaks at an elevated temperature to regenerate the blocking agent and the free diisocyanate which can react with the polyester in the desired manner. Examples of the blocked diisocyanates include caprolactam blocked isophorone diisocyanate and caprolactam blocked hexamethylene diisocyanate. Examples of commercially available curing agents of this type are the 24-2400, 24-2430, and 24-2450 products sold under the CARGILL trademark.

An excess of from about 10 to 20%, preferably 5 to 10%, by weight of the diisocyanate may be used beyond the stoichiometric amount. The reaction of the polyester with the diisocyanate is performed in the absence of moisture at a temperature of from about 80° to about 230° C. and, when a blocked diisocyanate is used, the temperature is preferably at least about 120° C. and is more preferably about 200° C. or higher. Dibutyltin dilaurate and triethylene diamine are examples of the catalysts that may be used to promote the diisocyanate cure. The use of blocked isocyanates in the curing of coatings is described in a paper presented by T. A. Potter, J. W. Rosthauser, and H. G. Schmelzer at the Water-Borne & Higher-Solids Coatings Symposium at New Orleans on Feb. 5–7, 1986; the paper is incorporated herein by reference.

Carboxyl-functional polyesters are also suitable for the purposes of this invention. They may be made from the same polyfunctional acids and glycols as are the hydroxyl-functional polyesters but with an excess of the acids. The acid number is from about 18 to about 55. They are exemplified by products sold under the trademarks CRYLCOAT 430, CRYLCOAT 3010, URALAC 3400, URALAC 3900, and GRILESTA V7372, which has a $T_g$ of 60° C. and an acid number of 32–35, and which is sold by Ems-Chemie AG. Fast cures are achieved with polyepoxide curing agents such as triglycidyl isocyanurate (TGIC).

A hybrid resin system is typically considered a mixture of a carboxyl-functional polyester and an epoxy resin. The acidic polyester suitably has an equivalent weight of 550–1100 and the epoxy resin has an equivalent weight of 600–1000. Zinc oxide is effective as a catalyst at 1–5 parts per hundred parts by weight of the resins to improve the cure rate and physical properties of the product. Other hybrid resin systems such as the epoxy-acrylic and polyester-acrylic mixtures mentioned above are also suitable for this invention.

The preferred acrylic resins for coating powders are copolymers of alkyl acrylates and/or methacrylates with glycidyl-methacrylates and/or acrylates and olefinic monomers such as styrene. Glycidyl-functional acrylic resins are sold by Mitsui Toatsu Chemicals, Inc. under the trademark ALMATEX (e.g., PD-7610, PD-7690, PD-6100). The ALMATEX PD-7610 resin, for example, has an epoxy equivalent of 510–560 and a melt index of 50–58. Solid dicarboxylic acids having, for example, 10 or 12 carbon atoms are used to cure the glycidyl-functional acrylic resins. A carboxy-terminated polymer may also be used as a cross-linking agent for such acrylic resins. Hydroxyalkyl acrylate and methacrylate copolymers are also suitable for this invention.

Suitable silicone resins for use in this invention should be solid at room temperature and preferably have a $T_g$ of at least about 45° C. The organic moieties of the silicone resins are aryl, particularly phenyl, or short chain ($C_1$–$C_4$) alkyl. For good heat resistance, methyl and phenyl groups are the organic moieties of choice. Generally, the more phenyl groups, the higher heat-resistance provided. Examples of such silicone resins are phenylsilicone SY-430, sold by Wacker Silicone, Conshohocken, Pa., having an average molecular wt. of about 1700, methylsilicone MK also sold by Wacker and methylphenylsilicone 6-2230 sold by Dow Corning.

For high temperature stability, silicone resins useful in the invention have a degree of substitution as described in *Silicones in Protective Coatings*, supra of about 1.5 or less, typically between about 1 and about 1.5. Specifically, degree of substitution is defined as the average number of substituent groups per silicon atom and is the summation of the mole per cent multiplied by the number of substituents for each ingredient. Silicon resins are used which self-condense at high end-use temperatures, e.g., that of a barbecue grill or an automobile exhaust part. This requires siloxane functionality (Si—O—H), and silicone resins used herein have an —OH content of between about 2.5 and about 7.5 wt. % of the silicone resin. Suitable silicone resins for use in the invention are discussed in "Silicones in Protective Coatings" by Lawrence H. Brown in *Treatise on Coatings* Vol. 1, Part III "Film-Forming Compositions" PP. 513–563, R. R. Meyers and J. S. Long eds. Marcel Dekker, Inc. New York, 1972, the teachings of which are incorporated herein by reference. Suitable silicone resins are also described in U.S. Pat. Nos. 3,170,890 and 4,879,344 3,585,065 and 4,107,148, the teachings of which are incorporated herein by reference.

Additives suitable for inclusion in the coating powder compositions include antioxidants, light stabilizers, pigments and dyes, processing aids, anti-blocking agents, and the anti-cratering agents.

Examples of antioxidants include, but are not limited to: hindered phenols, phosphites, and propionates. Examples of hindered phenols are 1,3,5-trimethyl-2,4,6-tris-(3,5-di-tert-butyl-4-hydroxybenzyl)benzene; octadecyl-3-(3,5-ditert-butyl-4-hydroxyphenyl)propionate; tetrakis [methylene-3 (3',5'-di-tert-butyl-4'-hydroxyphenyl)-propionate]methane); 4,4'-butylidene-bis(5-methyl-2-t-butyl)phenyl; and 2,2'-ethylidene-bis-(4,6-di-tert-butylphenol). Examples of phosphite antioxidants are tris(2,4-di-tert-butyl-phenyl) phosphite; bis(2,4-di-t-butyl-phenyl) pentaerythritol diphosphite; and 2,2'-ethylidene-bis(4,6-di-t-butylphenyl) fluorophosphite. Examples of propionate antioxidants are dilauryl thiodipropionate and distearyl thiodipropionate. IRGANOX 1010 hundred phenol and IRGAFOS 168 phosphite are commercially available antioxidants. Antioxidants may be used in amounts ranging from about 0.01 to about 2.0 percent by weight of the powder.

Light stabilizers and UV absorbers are exemplified by benzophenone stabilizers, such as those sold under the trademarks CYASORB-UV 2018 (American Cyanamid), hindered amine compounds, including those marketed by Ciba Geigy under the trademarks TINUVIN 144, TINUVIN 292, TINUVIN 944, TINUVIN 622LD, and TINUVIN 770 (N,N-diphenyl-N,N-di-2-naphthyl-p-phenylene-diamine), and BASF's UVINUL M40 and UVINUL 490, particularly those containing tetraalkyl-piperidinyl functionality, and UV absorbers marketed by Ciba Geigy under the trademark TINUVIN 900 and by American Cyanamid under CYANOX 3346.

Examples of antiblocking agents (dry flow agents) are fumed silica, clay, talc, fumed alumina, and precipitated silica. Commercial examples of anti-blocking agents are sold under the trademarks AEROSIL and CABOSIL. Flow levelling (anti-cratering) agents are sold under the trademarks TROY EX-486 and RESIFLOW P-67 (a low molecular weight acrylic resin). Other additives often used to de-gas the films are sold under the trademarks URAFLOW B (benzoin), OXYMELT A-1 and OXYMELT A-2.

In FIG. 1, the particle size distribution for the coating powder of this invention is shown to be extremely narrow. With the exception of a minor amount of fines having particle diameter of less than 2, the particle sizes of the powder are all within the range of from about 2 to about 40 microns. About 96% of the volume of the powder has a particle size of 20 microns or less. About 75% of its volume has a particle size between 2 and 20 microns. The mean particle size is about 4.4 microns and the median size is from about 6 to about 7 microns; in this sample, the median particle size is about 6.6 microns. The measurement of the particle sizes was made with a COULTER LS Particle Size Analyzer wherein a Fraunhofer optical model (PIDS included) and an LS 130 fluid module is used. The powder sample was dispersed in an aqueous medium and measurement taken when the pump speed was 51, the obscuration was 8% and the PIDS obscuration was 48%. The bulk density of the powder is less than about 0.5 gram per cubic centimeter, preferably from about 0.3 to about 0.45 gram per cubic centimeter in contrast to a bulk density of about 0.6 g/cc for a powder of the same formulation which had been melt mixed and ground in the conventional manner.

Figure 2:
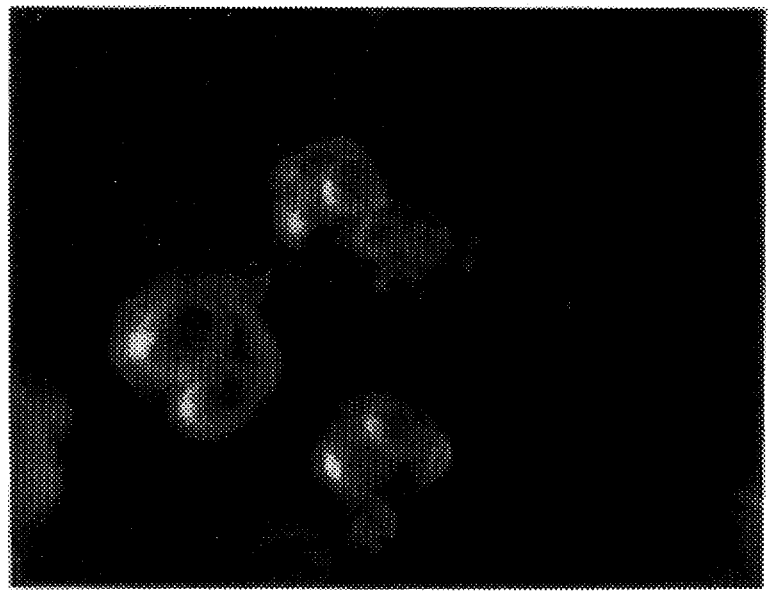
FIG. 2 is a photomicrograph at a magnification of 400X of a coating powder of this invention.

In FIG. 2, the particles of the coating powder of this inventions are shown as seen on a wet slide with an optical microscope at 400X magnification. The generally spherical shape of the particles is shown and the bulbous multi-directional protuberances from the spherical surfaces are evident. The particles in this photomicrograph were taken from a sample of the coating powder of this invention which had been slurried in water with a surfactant for about 14 hours. These particles floated initially on the water and settled only after several hours of stirring with a magnetic stirrer, as opposed to the immediate settling of the powder having the same formulation shown in FIG. 5. The bulbous portions of the particles, as photographed, contain water which entered the hollow protuberances from the slurry.

Figure 3:
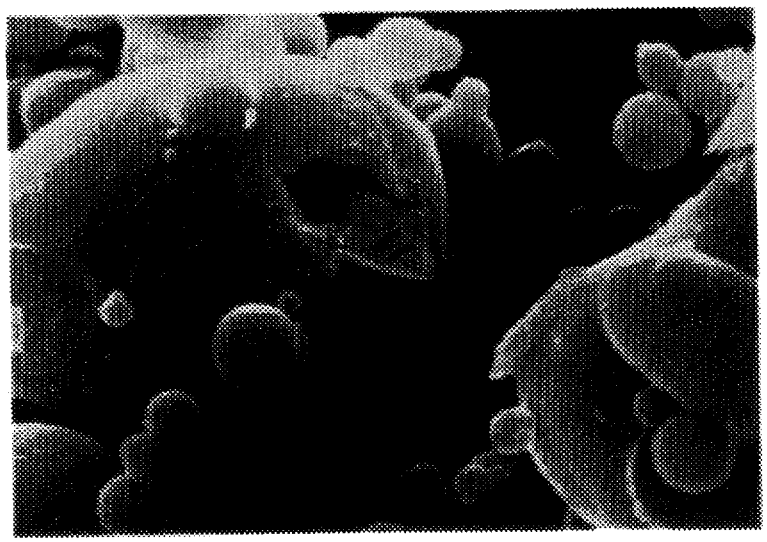
FIG. 3 is a scanning electron micrograph of particles of the coating powder of this invention after having been immersed in liquid nitrogen causing some to fracture.

In FIG. 3, a fractured particle is shown by the scanning electron microscope to have a hollow interior portion. Although the legend above the photograph indicates a magnification of 3400X, that applies only to a 4×5 photograph. The actual magnification, as measured by the scale line representing a length of 10 microns, is about 6000X.

Figure 4:
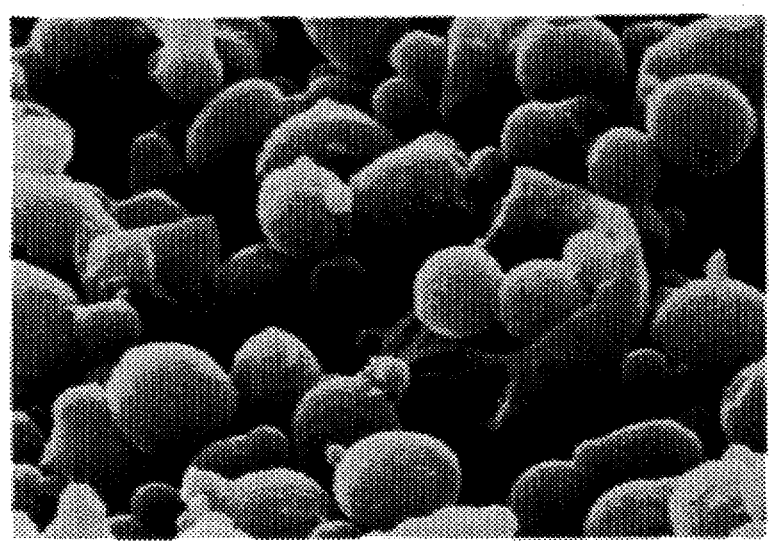
FIG. 4 is a scanning electron micrograph of other particles of the coating powder of this invention, some of which have also been fractured by immersion in liquid nitrogen.

In FIG. 4, the concave shell of a particle fragment at the right center of the photograph indicates that the particle was hollow before being fractured. The shell wall is also seen to be quite thin relative to the size of the particle. In the lowest portion of said wall, a crater left by a broken-off bulbous protrusion is visible. The magnification of the particles in this photo is about 5500X, according to the scale line.

Figure 5:
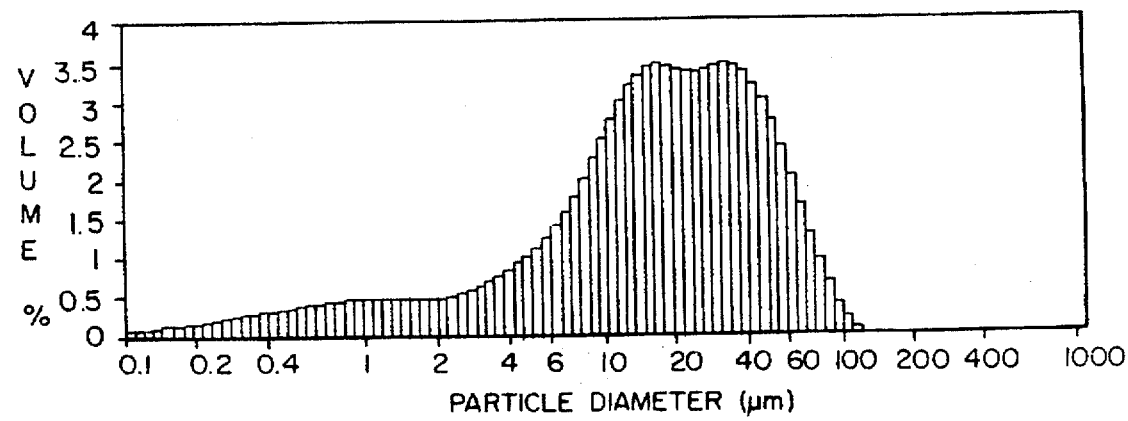
FIG. 5 is a graph showing the particle size distribution of a coating powder having the same chemical formulation as that of the powder of FIG. 1 but which has been comminuted by the conventional grinding process.

In FIG. 5, the particle size distribution for a coating powder of the prior art is shown to be about twice as broad as that of the powder of this invention. About 10% of the volume of the powder has a particle size of 2 microns or less. About 10% of its volume has a particle size of 50 microns or greater and about 25 % has a particle size of 35 microns or greater. The mean particle size is about 13.7 microns and the median size is about 17.9 microns. The measurement of the particle sizes was made with a COULTER LS Particle Size Analyzer wherein a Fraunhofer optical model (PIDS included) and an LS 130 fluid module is used. The powder sample was dispersed in an aqueous medium and measurement taken when the pump speed was 15, the obscuration was 4 % and the PIDS obscuration was 40 %.

The apparatus described in U.S. Pat. Nos. 5,027,742; 5,171,613; 4,734,227; 4,582,731; and 4,734,451 may be used to prepare the coating powder of this inventions. Said patents are incorporated herein by reference for their description of the apparatus.

As a specific example of the embodiment of the invention, 2407 parts of a poly (glycidyl methacrylate) resin having an epoxy equivalent weight of 510–560 and a melt index of 50–58 (sold by Mitsui Toatsu Chemicals, Inc. under the trademark ALMATEX PD-7610) is blended with 493 parts of dodecanedioic acid, 116 parts of the DOW XU71944.00L epoxy resin, 58 parts of a resinous anti-cratering agent TROY EX-486, 58 parts of the TINUVIN 900 UV absorber, and 29 parts of the TINUVIN 622 light stabilizer. To 35 parts of the blend there is added 65 parts of tetrahydrofuran to help dissolve the dodecanedioic acid and make a coating material for the purposes of this invention.

This material is then mixed with carbon dioxide in the mixing chamber of the apparatus and the temperature and pressure are raised to give a supercritical fluid solution containing approximately 26.25% nonvolatile powder solids, 48.75% THF, and 25% carbon dioxide. The temperature of the supercritical fluid solution will vary from the critical temperature of the fluid up to a temperature less than the curing temperature of the coating powder. The solution is sprayed into a drying zone in which the pressure is lower than that of the supercritical fluid. The powder is collected and residual THF is removed by evaporation under vacuum. Agglomerates of the particles are broken up by the addition of 0.1% by weight of AEROSIL R-972 silica.

The resulting product of this invention is electrostatically sprayed onto a 3"×6" aluminum panel. The powder coated panel is heated to 325° F. for 15 minutes and a continuous 0.2 mil thick film is obtained. In contrast to that, a comparably smooth fused powder coating can be achieved with coating powders of the prior art only when the film is about 1.5 to 2.0 mils thick. Coated test panels using conventional and inventive spray dried powders were cured for 15 minutes at 325° F. and their coating properties measured. Coating properties of the test panels are set forth in Table II.

TABLE II

|  | CONVENTIONAL | INVENTION SPRAY DRIED |
|---|---|---|
| DIRECT IMPACT | 60 IN-LBS | 60 IN-LBS |
| GLOSS 20° @ 0.5 MIL | 125 | 135 |
| 1.0 MIL | 130 | 140 |
| MEK RUBS (50 DOUBLE) | 2 | 2 |
| PCI SMOOTHNESS | 8.5 @ 2.0 MIL | 10 @ 0.5 MIL |

Coatings of spray dried acrylic of the invention versus ground products are tested to determine the relative smoothness of the coatings. Wavy structures with sizes between 0.1 mm and 10 mm are considered as orange peel or microwaviness. Orange peel is observed as a wavy, light-dark pattern on a high gloss surface. The type of structures that can be seen is dependent on the observation distance:

long-term wariness at distances of 2 to 3 m short-term waviness at about 50 cm.

The measurements are taken using a BYK-Gardner wave scan plus instrument. The instrument optically scans the wavy, light dark pattern on the surface over a distance of 10 cm (4 in) and detects the reflected light intensity point by point. The measured optical profile is divided into long-term wariness (structure size 0.6–10 mm)

short-term wariness (structure size 0.1–0.6 mm)

Long-term and short-term waviness are an indirect measure for analysis of production influences such as substrate roughness, flow and levelling properties and curing conditions.

The data obtained from the wave scan is set forth in Table III below:

TABLE III

|  | Long Term Waviness @ 0.2–0.4 Mils Thickness | Short Term Waviness @ 0.2–0.4 Mils Thickness |
|---|---|---|
| Conventional-100 mesh | 30.2 | 18.3 |
| Conventional-400 mesh | 27.2 | 19.4 |
| Product of this Invention | 18.3 | — |
|  | Long Term Waviness @ 0.6–0.9 Mils Thickness | Short Term Waviness @ 0.6–0.9 Mils Thickness |
| Conventional-100 Mesh | 32.6 | 36.3 |
| Conventional-400 Mesh | 18.8 | 30.2 |
| Product of this Invention | 11.8 | 15.2 |

As can be seen from the above wave-scan data, the coatings resulting from the spray dried powder of the present invention provide superior surface smoothness compared to conventional powders. Such smooth coatings of this invention may have a thickness of about 1 mil or less, preferably from 0.2 to about 1 mil; smooth coatings of this invention may, of course, be much thicker but such coatings would lose the advantage of low cost and weight and waste the advantage afforded by the powder of this invention wherein the major portion consists of particles having a diameter less than 1 mil.

The coating of non-metallic articles made from wood, plastic, and wood composites, for example, may be accomplished by suspension of a pre-heated article in a fluidized bed of the coating powder of this invention or by electrostatically spraying the powder onto a pre-heated article followed by careful heating to fuse a thermoplastic powder or cure a thermosetting powder. Also, a primer or the like which contains electroconductive pigments or additives may serve as a receptor on non-metallic articles for electrostatically sprayed coating powders of this invention.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

The subject matter claimed is:

1. A coating powder consisting essentially of cellular, generally spherical particles wherein about 96% by volume of the particles have a size of about 20 microns or less.

2. The powder of claim 1 characterized further in that it is thermosettable.

3. The powder of claim 1 wherein the particles range in size from less than 2 to about 40 microns.

4. The powder of claim 3 wherein the median particle size is from about 6 to about 7 microns.

5. The powder of claim 2 further characterized by a formulation comprising a thermosettable resin having a $T_g$ of a least about 50° C.

6. The powder of claim 5 wherein the formulation comprises a glycidyl functional acrylic resin.

7. A method for applying a continuous film of cured coating powder to a substrate, said method comprising spraying a powder consisting essentially of cellular, generally spherical particles having a particle size distribution such that about 96% by volume of the particles have a size of about 20 microns or less onto a substrate, fusing the powder, and curing the powder.

8. The method of claim 7 wherein the particles range in size from less than 2 to about 40 microns.

9. The method of claim 7 wherein the powder is electrostatically charged prior to being sprayed onto said substrate.

10. A powder coated wooden article prepared by applying a coating powder consisting essentially of cellular, generally spherical particles having a particle size distribution such that about 96% by volume of the particles have a size of about 20 microns or less, heating the powder to fuse it, and, optionally, heating the resultant fused film to cure it.

11. The wooden article of claim 10 wherein the particles range in size from less than 2 to about 40 microns.

12. The wooden article of claim 11 wherein the median particle size is from about 6 to about 7 microns.

13. The coating powder of claim 1 characterized further in that it is surfactant-free.

14. A powder coated article prepared by applying a coating powder consisting essentially of cellular, generally spherical particles having a particle size distribution such that about 96% by volume of the particles have a size of about 20 microns or less, heating the powder to fuse it, and, optionally, heating the resultant fused film to cure it.

* * * * *